(12) United States Patent
Simplicio Junior et al.

(10) Patent No.: US 9,693,226 B2
(45) Date of Patent: Jun. 27, 2017

(54) METHOD AND APPARATUS FOR SECURING A CONNECTION IN A COMMUNICATIONS NETWORK

(71) Applicant: Telefonaktiebolaget L M Ericsson (publ), Stockholm (SE)

(72) Inventors: Marcos Antonio Simplicio Junior, Sao Paolo (BR); Tereza Cristina Carvalho, Sao Paulo (BR); Cristina Dominicini, Vila Velha (BR); Peter Håkansson, Lidingö (SE); Leonardo Horn Iwaya, Sao Paolo (BR); Mats Näslund, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/437,261

(22) PCT Filed: Oct. 29, 2012

(86) PCT No.: PCT/EP2012/071354
§ 371 (c)(1),
(2) Date: Apr. 21, 2015

(87) PCT Pub. No.: WO2014/067543
PCT Pub. Date: May 8, 2014

(65) Prior Publication Data
US 2015/0281958 A1    Oct. 1, 2015

(51) Int. Cl.
*H04L 9/32* (2006.01)
*H04L 9/00* (2006.01)
(Continued)

(52) U.S. Cl.
CPC .......... *H04W 12/06* (2013.01); *H04B 1/3816* (2013.01); *H04L 9/0894* (2013.01); *H04L 9/3236* (2013.01); *H04W 12/04* (2013.01)

(58) Field of Classification Search
CPC .... H04W 12/06; H04W 12/04; H04L 9/3236; H04L 9/0894; H04B 1/3816
(Continued)

(56) References Cited

U.S. PATENT DOCUMENTS

| 2006/0182280 A1* | 8/2006 | Laitinen | H04L 63/06 380/247 |
| 2006/0205388 A1* | 9/2006 | Semple | H04L 63/0853 455/411 |

(Continued)

FOREIGN PATENT DOCUMENTS

WO    WO 2007/063420    6/2007

OTHER PUBLICATIONS

PCT International Search Report for International application No. PCT/EP2012/071354, Jun. 10, 2013.
(Continued)

*Primary Examiner* — Aravind Moorthy
(74) *Attorney, Agent, or Firm* — Baker Botts, LLP

(57) ABSTRACT

Method and Apparatus for Securing a Connection in a Communications Network A method of operating a user equipment (UE) using a Generic Bootstrapping Architecture (GBA) is provided. The method includes establishing a shared secret between the UE and a Network Application Function (NAF). An authentication request is sent to a Bootstrapping Server Function (BSF) by the UE. An original parameter intended for a key derivation function and a bootstrapping transaction identifier is received from the BSF. An application request, including the bootstrapping transaction identifier, is sent by the UE to the NAF. A modified parameter is derived by the UE from the secret and the original parameter intended for the key derivation function. A cryptographic key is determined using said modified parameter in place of or in addition to the original parameter (Continued)

in the key derivation function, and communications with the NAF are secured using the key.

28 Claims, 7 Drawing Sheets

(51) Int. Cl.
*H04K 1/00* (2006.01)
*H04L 9/08* (2006.01)
*H04W 12/06* (2009.01)
*H04W 12/04* (2009.01)
*H04B 1/3816* (2015.01)

(58) Field of Classification Search
USPC ........ 713/155, 168, 171; 380/262, 270, 273, 380/278
See application file for complete search history.

(56) References Cited

U.S. PATENT DOCUMENTS

| | | | | |
|---|---|---|---|---|
| 2007/0234041 | A1* | 10/2007 | Lakshmeshwar | H04L 9/3271 713/156 |
| 2008/0215888 | A1* | 9/2008 | Barriga | H04L 63/0807 713/176 |
| 2009/0117877 | A1* | 5/2009 | Yang | H04L 63/06 455/411 |
| 2011/0004754 | A1 | 1/2011 | Walker et al. | |
| 2011/0145575 | A1 | 6/2011 | Blommaert et al. | |
| 2011/0320802 | A1* | 12/2011 | Wang | H04L 9/0822 713/2 |
| 2012/0254959 | A1* | 10/2012 | Schmidt | H04L 63/061 726/6 |
| 2013/0290723 | A1* | 10/2013 | Yu | H04W 12/04 713/171 |
| 2014/0033282 | A1* | 1/2014 | Bournelle | H04L 63/08 726/4 |
| 2015/0065089 | A1* | 3/2015 | Nakarmi | H04L 9/083 455/411 |
| 2015/0163669 | A1* | 6/2015 | Holtmanns | H04L 9/0869 726/6 |

OTHER PUBLICATIONS

3GPP TSG SA WG3 (Security) meeting #64; Mainz, DE; Title: pCR to TR 33.sso Section 8; Agenda Item: Integration of Single Sign-On (SSO) frameworks with the basic 3GPP AKA mechanism (S3-110649), Jul. 11-15, 2011.

3GPP TS 33.102 V11.4.0; 3rd Generation Partnership Project; Technical Specification Group Services and System Aspects; 3G Security; Security architecture (Release 11), Sep. 2012.

3GPP TS 33.220 V11.4.0; 3rd Generation Partnership Project; Technical Specification Group Services and System Aspects; Generic Authentication Architecture (GAA); Generic Bootstrapping Architecture (GBA) (Release 11), Sep. 2012.

* cited by examiner

METHOD AND APPARATUS FOR SECURING A CONNECTION IN A COMMUNICATIONS NETWORK

PRIORITY

This nonprovisional application is a U.S. National Stage Filing under 35 U.S.C. §371 of International Patent Application Serial No. PCT/EP2012/071354, filed Oct. 29, 2012, and entitled "Method and Apparatus for Securing a Connection in a Communications Network."

TECHNICAL FIELD

The present invention relates to a method and apparatus for securing a connection in a communications network. More particularly, though not necessarily, the invention relates to methods and apparatus for two factor authentication within the Generic Bootstrapping Architecture.

BACKGROUND

We are today seeing a development towards a Networked Society. An increasing proportion of users' daily life is spent using telecommunication services such as telephony, instant messaging, email or accessing Internet services. Even users' personal data e.g. documents, music, photos, etc. are being stored on networked services "in the cloud". Social networks provide communication, online presence and document sharing. Both public and private sector companies rely on telecommunication and cloud services for increasing amounts of their business. Security and privacy for users and enterprises is therefore increasing in importance. Particularly important aspects are authentication and data encryption.

Services provided by a traditional (mobile) network operator are considered to have a high level of trust. The services are usually well protected against third parties using strong, SIM-based authentication and data encryption. Thus, security is also transparent to the user. For services provided "over the top", e.g. Internet services, the situation is very different. The security provided is typically based on user name and password, making the solution cumbersome for end-users and relatively insecure due to the difficulty of managing strong passwords.

In order to facilitate the provision of services (such as operator provided or over the top services) to user terminals, a mobile network such as a 3G network can provide for the establishment of a secure communication channel or "security association" between client terminals (i.e. mobile terminals) and the service nodes which provide the services. The Generic Bootstrapping Architecture (GBA) defined in the 3GPP Technical Specification TS 33.220 V11.4.0 (2011-12) provides a mechanism whereby a client terminal (UE) can be authenticated to a Network Application Function (NAF) (i.e. an Application Server), and secure session keys obtained for use between the client terminal and the NAF. FIG. 1 illustrates schematically an example of the simple network model for the GBA, as described in 3GPP TS 33.220, which comprises a Bootstrapping Server Function (BSF), a Network Application Function (NAF), a Subscriber Locator Function (SLF), a Home Subscriber System (HSS) and the User Equipment (UE). Communication between the NAF and the UE takes place over reference point Ua, communication between the NAF and the BSF takes place over reference point Zn, communication between the UE and the BSF takes place over reference point Ub, communication between the BSF and the HSS takes place over reference point Zh and communication between the BSF and the SLF takes place over reference point Dz.

When the UE wishes to contact a NAF and no security association between the UE and the NAF has been established at an earlier stage, the UE may contact the NAF with a request for communication and the request may not include any GBA-related parameters. If the NAF requires the use of a security association obtained by means of the GBA, the NAF may respond to the UE with a bootstrapping initiation message. The UE will then start a bootstrapping procedure with the BSF. The GBA provides a mechanism to bootstrap the Authentication and Key Agreement (AKA) for application security from the 3GPP AKA mechanism described in 3GPP TS 33.102. This mechanism allows a UE to be authenticated to a BSF and to obtain a master key (Ks) and a Bootstrapping Transaction Identifier (B-TID). GBA User Security Settings (GUSS) is a set of all user security settings and is stored in the HSS. During the bootstrapping procedure, the BSF obtains the GUSS from the HSS. The bootstrapping procedure is indicated in FIG. 2 as step 2.1.

The master key Ks is shared between the UE and the BSF, but not with the NAF. Instead, an application specific key Ks_NAF is derived by the UE. The derivation of Ks_NAF is performed by a key derivation function (KDF), defined as KDF(Ks, "gba-me", nonce, IMPI, NAF_id). The term "nonce" is used here to indicate an arbitrary number that may be used only once in a cryptographic communication and which may help to defend against replay attacks. Ks is the master key defined earlier; "gba-me" is a fixed value; nonce is a nonce (an arbitrary number used only once in a cryptographic communication) used to generate Ks; IMPI is the Internet Protocol Multimedia Private Identity of the UE; and NAF_id is the NAF identifier of the NAF. The NAF_id is constructed by a concatenation of a Fully Qualified Domain Name (FQDN) of the NAF and a security protocol identifier of reference point Ua. The derivation of Ks_NAF is described in 3GPP TS 33.220 and indicated in FIG. 2 as step 2.2.

The UE then supplies the B_TID to the NAF over reference point Ua in an application request. This step is indicated in FIG. 2 as step 2.3. After receipt of the application request at the NAF, the NAF determines the NAF_id and verifies that the user is authorized to use the NAF_id, as indicated by step 2.4.1 in FIG. 2. The NAF then sends an authentication request including the B-TID and the NAF_id to the BSF over reference point Zn, as indicated by step 2.4.2 in FIG. 2.

On receipt of the authentication request, the BSF looks up the master key Ks using the B-TID and the BSF derives the application specific key Ks_NAF using the KDF and the NAF_id supplied by the NAF. This step is illustrated as step 2.5 in FIG. 2. The BSF sends an authentication answer including the Ks_NAF back to the NAF, as indicated by step 2.6 in FIG. 2. The BSF may also include other information, such as the bootstrapping time and the lifetime of the key, in the authentication answer to the NAF. If the key identified by the B_TID is not available at the BSF, the BSF will indicate this in a reply to the NAF and the NAF will then send a bootstrapping renegotiation request to the UE.

The NAF and the UE now both know the value of Ks_NAF and they can use that key to protect communication (step 2.7) between the NAF and the UE over reference point Ua. This protection may comprise e.g. encryption and/or integrity.

The UE comprises a mobile equipment (ME), and a Subscriber Identity Module (SIM or USIM), which may be contained on a Universal Integrated Circuit Card (UICC). The calculations in the UE involved in the above process may take place in processors of the ME (GBA_ME) or the UICC (GBA_U), with possibly different parts of the calculations being spread across these entities.

The above process provides strong security and can be made more or less transparent to the end user.

This bootstrapping architecture enables mutual authentication and key agreement between the UE and the NAF. However some NAFs may need verification beyond that provided by the network, for example to authenticate the user behind the UE, or a third party device to which the UE is connected. This problem is not tackled by the GBA architecture, which only authenticates the UE (more precisely, the SIM/USIM).

Another issue is that in a GBA-based solution, the mobile operator has knowledge of the key between the UE and the NAF, and so can potentially access communications. This is normally not a problem as mobile operators can be considered trustworthy. However, in some use cases such as mobile health, banking, or access to other high value content, there may be regulatory requirements or privacy concerns which forbid the use of protocols which might allow any third party to access communications. Also, if an attacker gained access to keying materials from the HSS, they would then be able to decrypt future communications using keys derived from those materials.

Previous attempts to authenticate a user and a device simultaneously have had the disadvantage that they require disclosure of the user's secret to the BSF (or some other server controlled by the mobile network operator), which is clearly undesirable if the wish is to prevent the network operator from being able to access communications. Examples include the US patent application "Secure Bootstrapping Architecture Method Based on Password-Based Digest Authentication" US 2011/0145575 A1, and 3GPP TSG SA WG3 (Security) meeting #64 contribution S3-110649, which deals with integrating the OpenID system into an AKA-based method.

These problems can be mitigated by the use of a secondary authorisation protocol within the secure connection established by the GBA; however the extra signalling required can slow down the authentication process, making it more time consuming for the user. Otherwise, the UE can authenticate the user locally (i.e. without contacting any server), and only perform the GBA authentication once the local authentication has been established, for example SIM cards can be configured to require confirmation of a PIN shared between the SIM and the user before they will authenticate with the mobile network. However, it is generally preferred to verify passwords on the server side instead of locally on the device, as it makes the server authentication more resilient to attacks which may be able to fake the local authentication.

SUMMARY

According to a first aspect of the present invention there is provided a method of securing a session between a Network Application Function, NAF, and a User Equipment, UE, connected to a network, wherein the NAF is assigned a NAF identifier, NAF_id, using the Generic Bootstrapping Architecture, GBA, or a substantially similar architecture. The method comprises establishing a shared first secret between the UE and the NAF (S7.1). The method further comprises communicating an application request containing a bootstrapping transaction identifier to the NAF from the UE (S7.2) and communicating an authentication request comprising the bootstrapping transaction identifier, the NAF_id, and information derived from the first secret to a Bootstrapping Server Function, BSF, from the NAF (S7.4). The method further comprises determining in the BSF and the UE a NAF key, Ks_NAF, by using a modified parameter in place of or in addition to an original parameter in a key derivation function, the modified parameter being derived from the first secret and the original parameter of the key derivation function (S7.5), transmitting the NAF key from the BSF to the NAF (S7.6) and utilising the NAF key to secure communications between the NAF and the UE (S7.7).

Optionally, the original parameter may be the NAF_id, and the modified parameter may be a modified NAF_id (S8.3), and the authentication request may comprise the modified NAF_id, the modified NAF_id comprising the NAF_id and information derived from the first secret (S8.4). Alternatively, the modified parameter may be calculated in the BSF after receipt of the authentication request.

Optionally, the UE and the NAF may negotiate in order to establish a further shared security parameter or parameters, the negotiation being secured based on the NAF key (S7.7). The further security parameter or parameters may be established based on the first secret.

Optionally a second secret may be previously established between the NAF and a user of the UE, and establishing the first secret between the UE and the NAF may comprise the user inputting the second secret or information derived from such into the UE and the UE deriving the first secret from the second secret.

Optionally, a third secret may be previously established between the NAF and some other apparatus, and establishing the first secret between the UE and the NAF may comprise the other apparatus transmitting the third secret or information derived from such to the UE and the UE deriving the first secret from the third secret. The other apparatus may be a medical monitoring device. The other apparatus and the NAF may negotiate in order to establish a further shared security parameter or parameters, the negotiation being relayed via the UE and at least the communication between the UE and NAF may be secured based on the NAF key. The further shared security parameter or parameters may be established based on the third secret.

The information derived from the first secret may be the first secret (S7.3.1), the result of a cryptographic hash function applied to the first secret (S7.3.2) and optionally the bootstrapping transaction identifier, or the result of a cryptographic hash function applied to the first secret, a nonce (S7.3.4) and optionally the bootstrapping transaction identifier. The method may comprise the step of generating the nonce in the NAF and transmitting the nonce from the NAF to the UE, or vice versa.

The modified parameter may be generated by concatenation of the original parameter and the information derived from the first secret in any order.

The user equipment, UE, comprises a mobile equipment, ME, and a Subscriber Identity Module, SIM, which may be contained on a Universal Integrated Circuit Card, UICC.

According to a second aspect of the present invention, there is provided an apparatus (500) configured to operate as a mobile equipment, ME, for use in the method of the first aspect. Steps of the method of the first aspect may be performed on the UICC or in the ME, and the ME comprises interfaces to access the components on the UICC which perform steps of the method.

According to a third aspect of the present invention there is provided an apparatus (400) for use as a Network Application Function, NAF, in the method of a first aspect.

The apparatus of the second or third aspect may be used in a vehicle.

According to a fourth aspect of the present invention, there is provided an apparatus for use as a bootstrapping server function, BSF, in the method of the first aspect.

According to a fifth aspect of the present invention there is provided a method of operating a user equipment, UE, in accordance with the first aspect.

According to a sixth aspect of the present invention there is provided a method of operating a network application function, NAF, in accordance with the first aspect.

According to a seventh aspect of the present invention there is provided a method of operating a bootstrapping server function, BSF, in accordance with the first aspect.

According to an eighth aspect of the present invention there is provided a computer program comprising computer readable code which, when run on an apparatus, causes the apparatus to behave as an apparatus according to the second, third, or forth aspect.

According to a ninth aspect of the present invention there is provided a computer program product comprising a computer readable medium, on which is stored a computer program according to the eighth aspect

DESCRIPTION OF DRAWINGS

Throughout the drawings, optional elements are marked by dashed lines or dashed boxes.

DESCRIPTION

Figure 1:
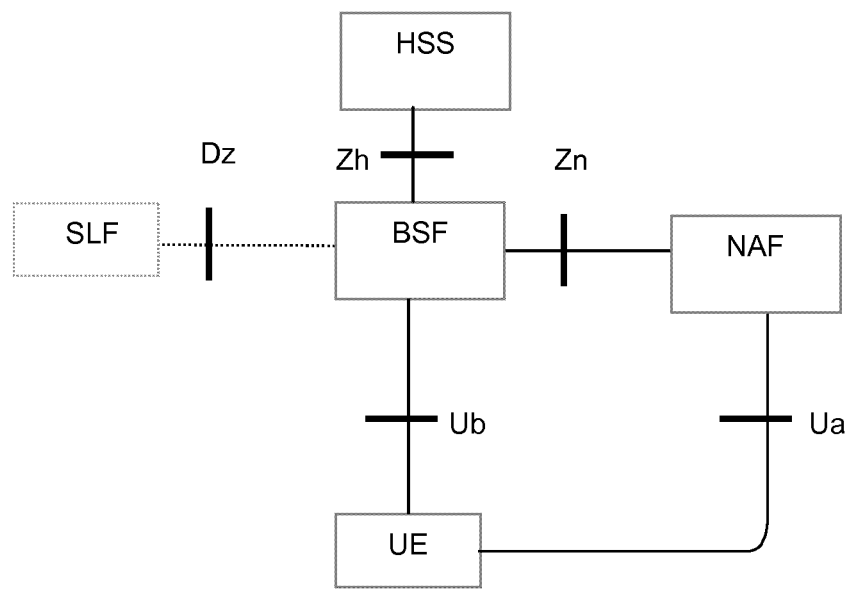
FIG. 1 illustrates schematically an example of a simple network model for the GBA.
Figure 2:
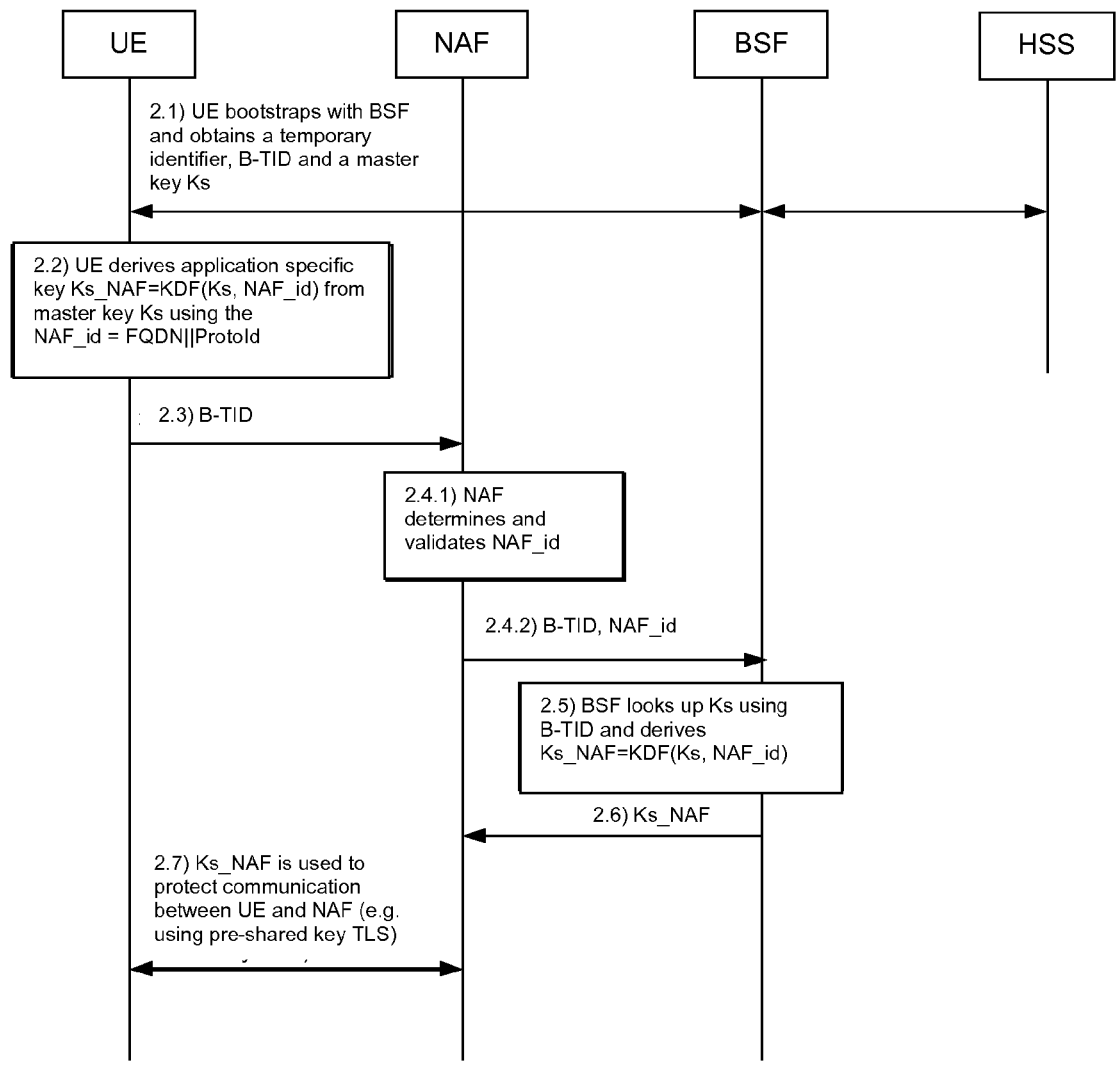
FIG. 2 illustrates an example signalling flow of a bootstrapping and key derivation mechanism provided by the GBA.

The Generic Bootstrapping Architecture (GBA) defined in the 3GPP Technical Specification TS 33.220 provides a mechanism whereby a client terminal (UE) can be authenticated to a Network Application Function (NAF), and secure session keys obtained for use between the UE and the NAF. As illustrated in FIG. 2, the GBA provides a mechanism whereby the UE bootstraps with a Bootstrapping Server Function (BSF) such that the UE is authenticated to the BSF and obtains a master key Ks and a Bootstrapping Transaction Identifier (B-TID). The UE then derives an application specific key Ks_NAF by a key derivation function (KDF), defined as KDF(Ks, "gba-me", nonce, IMPI, NAF_id). Ks is the master key defined earlier; "gba-me" is a fixed value; nonce is the nonce used to generate Ks; IMPI is the Internet Protocol Multimedia Private Identity of the UE; and NAF_id is the NAF identifier of the NAF. The NAF_ID is constructed by a concatenation of a Fully Qualified Domain Name (FQDN) of the NAF and a security protocol identifier of a reference point Ua over which communication between the UE and the NAF takes place. The UE then sends an application request including the B-TID to the NAF. On receipt of the request, the NAF determines and validates the NAF_ID. The NAF sends the B-TID and NAF_ID in an authentication request to the BSF. On receipt of the authentication request, the BSF looks up Ks using the received B-TID and derives the Ks_NAF using the KDF and the NAF_ID. The Ks_NAF is sent by the BSF in an authentication answer to the NAF. The NAF and the UE now share the same key Ks_NAF which can be used to protect communications between the NAF and the UE.

Note that the proposed solution can be applied in both GBA_U and the GBA_ME case, but for simplicity it is described here in the GBA_ME case. As is known to one of skill in the art, the relevant difference between GBA_ME and GBA_U is that in GBA_ME all the GBA relevant key derivations are done in the ME (outside the UICC) while in GBA_U, the GBA specific key derivations are done inside the UICC. In addition, in GBA_U there is one special copy of Ks_NAF (called KS_NAF_int) that never leaves the UICC. In a GBA_U case, the key calculations specific to the proposed solution may therefore be done in the UICC, while with GBA_ME they are always done in the ME. Similarly, when using the proposed solution in a setting substantially similar to GBA, it will be appreciated that certain parts of the proposed solution are best suited to be carried out in a "user device" (akin to an ME) whereas others may be carried out in some "user identity module" (akin to the SIM).

The following embodiments involve establishing a secret between the UE and the NAF then inserting this secret into the GBA key derivation by combining information derived from it with a parameter of the KDF to form a modified parameter. The modified parameter may be as close as possible in format to the original parameter to make compatibility with existing GBA systems easier to achieve (for example, in the GBA_U case this will ease interoperability with deployed UICCs). The modified parameter is calculated independently in the UE and the NAF or the BSF, and then used in place of the original parameter during the GBA process. Since the modified parameter is then used to calculate Ks_NAF, this causes Ks_NAF to be dependent on the secret shared between the UE and NAF, and so allows authentication or secure communication based on Ks_NAF. Since the UE and the BSF or NAF calculate the modified parameter separately, they will only arrive at the same Ks_NAF if the UE and NAF share the secret.

The information derived from the secret used to calculate the modified parameter is calculated independently in the NAF and UE, and then transmitted to the BSF as part of the authentication request from the NAF to the BSF. The BSF may calculate the modified parameter from this information and the original parameter, or, in the case where the original parameter is the NAF_id, the NAF may calculate the modified NAF_id and transmit this in place of the original NAF_id. In the case where the NAF transmits a modified NAF_id, the original NAF_id should be derivable from the modified NAF_id, and changes to the BSF may not be necessary to implement some embodiments.

The method of establishment of the secret between the UE and NAF will be dependent on the particular use case. For example if the NAF wishes to authenticate the user, the secret may be previously established between the user and the NAF, and the user may input the secret into the UE during the secure connection process. This and other embodiments will be discussed below, with reference to FIGS. 3 and 3A. Optional elements are indicated with dashed lines.

Figure 3:
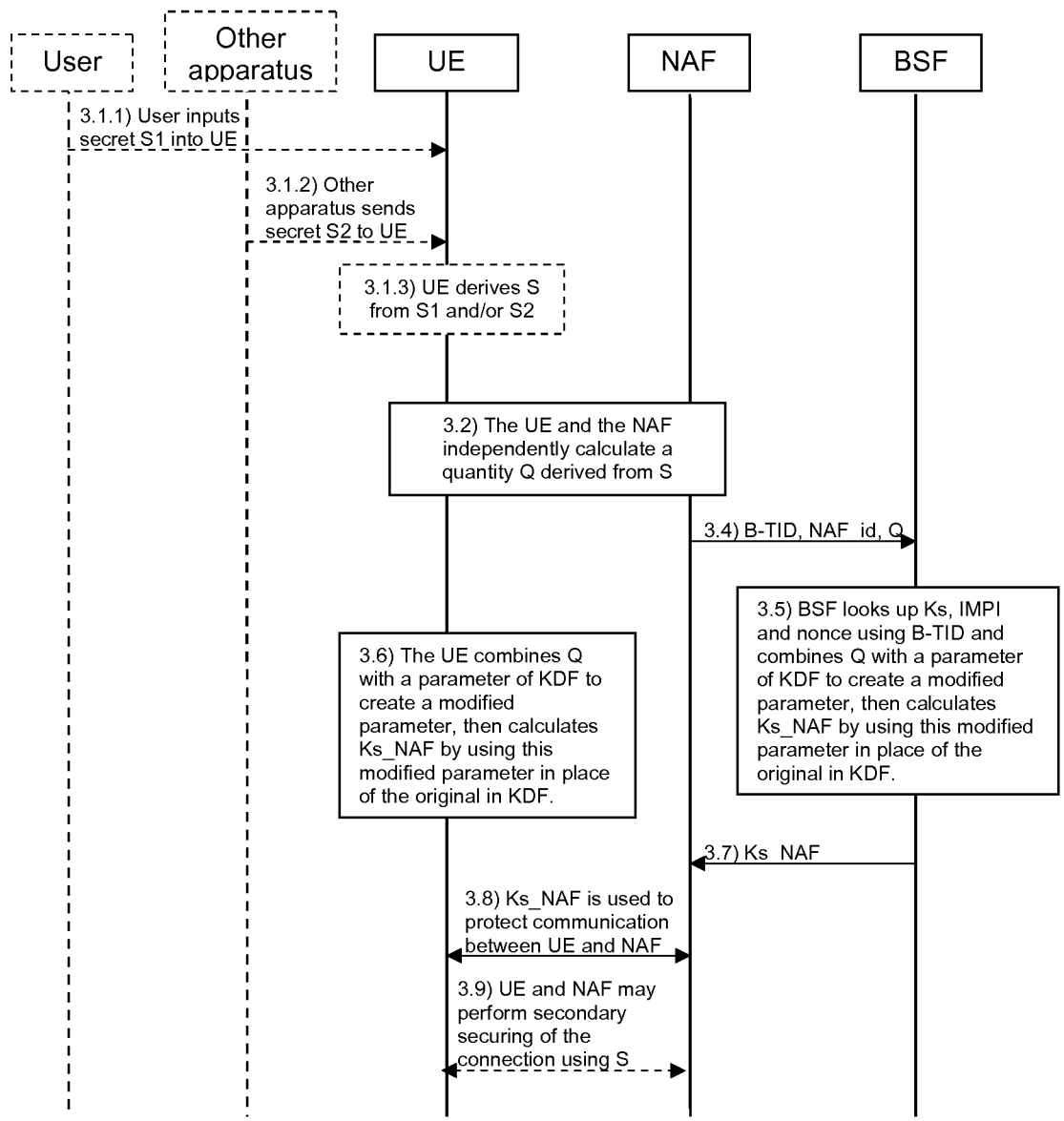
FIG. 3 illustrates the signalling flow of the modified GBA.

In a first embodiment, a secret (S) is established between the UE and the NAF, possibly by some method listed in the optional embodiments below. FIG. 3 shows the signalling steps involved in establishing the secure connection. For the purposes of this illustration, it will be assumed that the UE is already authenticated to the BSF, and the key Ks has been generated as part of this (2.1). This procedure takes as its basis the 3GPP GBA Technical Specification TS 33.220.

The NAF and the UE calculate a quantity (Q) derived from S (3.2). In the simplest example, Q can be S itself, or the information about S communicated to the UE by the user, which allows the BSF to learn S or the information derived from S. However as in many cases it will be desired to keep the secret S from the BSF, this derived information may be generated using some pseudo-random function (e.g. a secure cryptographic hash function) applied to S and one or more other quantities known to both the UE and the NAF (e.g. the B-TID, and/or a nonce communicated between the UE and NAF).

The NAF then sends an authentication request containing the B-TID, the NAF_id, and Q to the BSF (3.4). This is a change to the current GBA specification, where such a request would contain only the B-TID and NAF_id.

The BSF looks up Ks, IMPI, and the nonce using the B-TID, as in the current GBA specification. The BSF then derives a modified parameter from Q and an original parameter of the KDF (Ks, "gba-me", nonce, IMPI or NAF_id), and uses this modified parameter in place of or in addition to the original parameter when using the KDF to calculate Ks_NAF (3.5). Multiple parameters of the KDF may be modified if desired. The UE performs the same calculations as the BSF to calculate Ks_NAF (3.6).

Following this, steps 3.7 and 3.8 are functionally the same as in the unmodified GBA protocol:
3.7) The BSF sends Ks_NAF to the NAF,
3.8) The UE secures the connection with the NAF utilising Ks_NAF.

In a second embodiment, the changes required to the GBA specification and the operation of the BSF are reduced significantly by having the NAF calculate the modified parameter, allowing the BSF to use it as though it were the original parameter, with minimal extra calculation necessary.

Figure 3A:
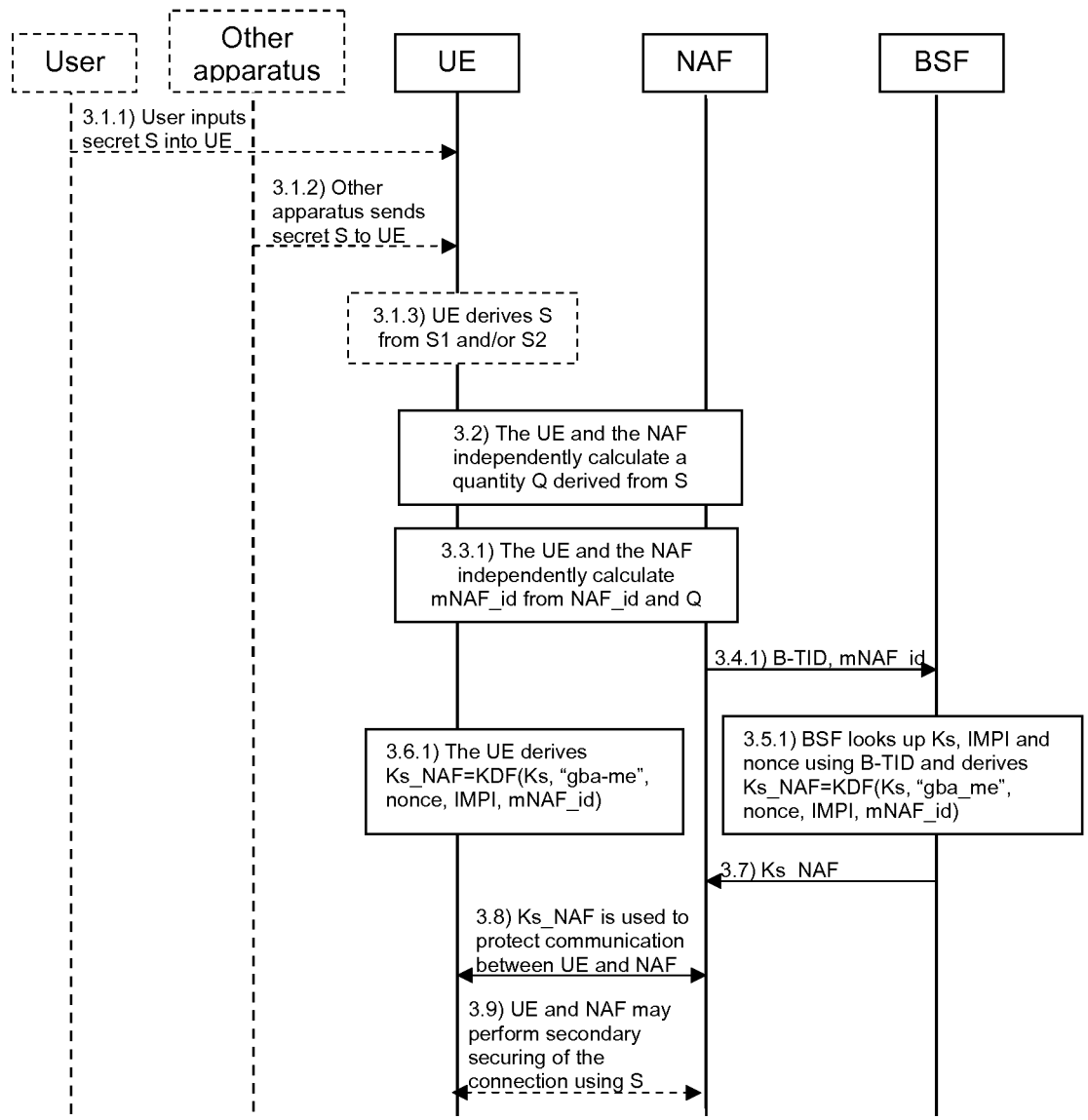
FIG. 3A illustrates the signalling flow of the modified GBA in the case where NAF_id is modified.

A secret (S) is established between the UE and the NAF, possibly by some method listed in the optional embodiments below. FIG. 3A shows the signalling steps involved in establishing the secure connection. For the purposes of this illustration, it will be assumed that the UE is already authenticated to the BSF, and the key Ks has been generated as part of this (2.1). This procedure takes as its basis the 3GPP GBA Technical Specification TS 33.220.

The NAF and the UE then calculate a quantity (Q) derived from S (3.2). In the simplest example, Q can be S itself, or the information about S communicated to the UE by the user, which allows the BSF to learn S or the information derived from S. However, in most cases it will be desired to keep the secret S from the BSF, so this derived information may be generated using some pseudo-random function (e.g. a secure cryptographic hash function) applied to S and one or more other quantities known to both the UE and the NAF (e.g. the B-TID, and/or a nonce communicated between the UE and NAF).

The NAF and the UE calculate a modified NAF identifier, mNAF_id, from NAF_id and Q (3.3.1). For example, the mNAF_id could be the NAF_id concatenated with Q (in any order). This may require a small change to the GBA specification, as some embodiments may rely on the format of NAF_id to derive the NAF_FQDN, and so confirm the origin of the authentication request.

Following this, steps 3.4 through 3.8 are functionally the same as in the unmodified GBA protocol, except that NAF_id is replaced by mNAF_id in 3.4, 3.5 and 3.6. The NAF sends this mNAF_id to the BSF as part of the authentication request in place of the NAF_id (3.4.1). The BSF carries out the bootstrapping procedure as usual, calculating Ks_NAF from mNAF_id and Ks (3.5.1). The UE calculates Ks_NAF from mNAF_id and Ks (3.6.1). The BSF sends Ks_NAF to the NAF (3.7). The UE secures the connection with the NAF utilising Ks_NAF (3.8).

Optional elements which may apply to either embodiment now follow:

The secret S may be established between the UE and the NAF based on a previous secret shared between a user of the UE and the NAF, which the user inputs into the UE, and from which the UE derives S (3.1.1). This may occur, for example, when an application wishes to authenticate both the UE and the user.

The secret S may be established between the UE and the NAF based on a previously established secret shared between the NAF and an apparatus capable of communicating with the UE, with the previously established secret or information derived from the previously established secret being transmitted to the UE by the apparatus, and the UE deriving S from this (3.1.2). Alternatively, the secret may be established based on both a secret shared between the NAF and the user, and a secret shared between the apparatus and the NAF. This may occur, for example, when an application wishes to authenticate both the UE and this other apparatus. The UE could also send S or information derived from S back to this other apparatus.

An example use of this optional element might be a health monitoring service incorporating a monitoring device, connected via e.g. Universal Serial Bus (USB), Bluetooth or ZigBee to their mobile telephone, which is connected to the cellular network. In this case the central hub would be the UE, and the NAF would authenticate the monitoring device by a secret stored within it (which the device may divulge directly or indirectly to the UE when it authenticates the UE upon connection). In some jurisdictions, the policy may forbid detailed information about health being transmitted over a channel which a third party could eavesdrop upon, so this use may make use of the secondary securing procedure of stage 3.9 as described below. Other examples of such optional elements comprise on-board units in vehicles (such as diagnostic or entertainment systems in cars), any kind of sensor or actuator device in a "smart grid", etc.

Optionally, the UE may, once the UE and NAF are communicating over a connection secured based on Ks_NAF, further secure the connection with the NAF (or vice versa) with any procedure utilising keys derived from S (3.9). This ensures that the BSF cannot access the resulting connection. This final step could be implemented as "post-processing" to the GBA, and so require no change to the specification. Correspondingly, in case of an aforementioned apparatus communicating with the UE, this other apparatus could use S and the previously established secret shared between the NAF and the apparatus in order to further secure the connection between the apparatus and the NAF. A secure connection could therefore be obtained directly between the apparatus and the NAF, using the UE to relay the communications, preventing even the UE from accessing transferred data.

As in GBA, many of the calculations can be performed either on the mobile equipment (ME) or on the UICC containing the SIM. This allows modification to either the GBA_ME or GBA_U versions of the GBA protocol.

Figure 4:
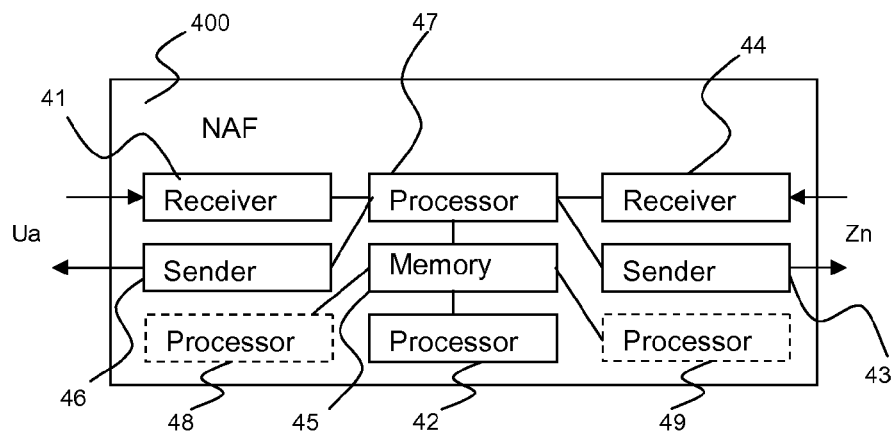
FIG. 4 illustrates schematically an example of a NAF for use in the modified GBA.

FIG. 4 illustrates schematically an example of a NAF 400 suitable for implementing the above embodiments. The NAF 400 can be implemented as a combination of computer hardware and software. The NAF 400 comprises a receiver 41 for receiving an application request from the UE over reference point Ua (S7.2) and a processor 42 for determining Q from a secret shared between the UE and the NAF (S7.3 etc., S8.3 etc.). The NAF 400 comprises a sender 43 for communicating an authentication request containing the B_TID, NAF_id and Q to the BSF (S7.4, S8.4) and a receiver 44 for receiving keying material from the BSF over reference point Zn (S7.6). The NAF also comprises a memory 45 for storing data, a processor 47 for securing the connection with the UE (S7.7), and a sender 46 which along with the receiver 41 is used to communicate with the UE over reference point Ua.

Optionally, the NAF may include a processor 48 used to perform a secondary procedure to further secure the session with the UE using the shared secret (S7.8). The NAF may also comprise a processor 49 for determining mNAF_id by combining NAF_id and Q (S8.3 etc.).

Figure 5:
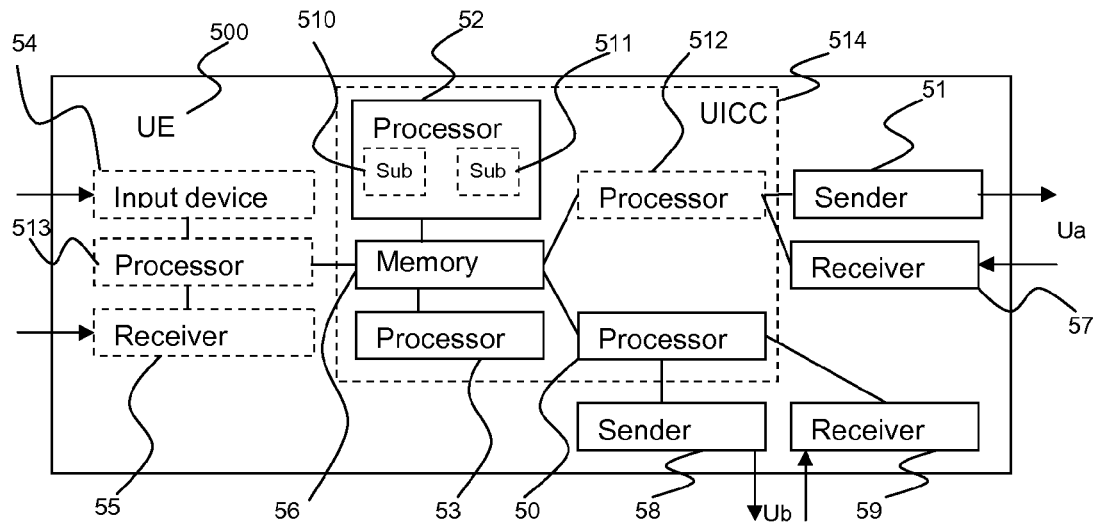
FIG. 5 illustrates schematically an example of a UE for use in the modified GBA.

FIG. 5 illustrates schematically an example of a UE 500 suitable for implementing the above embodiments, with optional elements indicated by dashed boxes. This assumes the GBA_U case. The UE 500 can be implemented as a combination of computer hardware and software. The UE 500 comprises a sender 51 for sending an application request to the NAF (S7.2) over reference point Ua, a processor 52 for determining Q (S7.3) and a processor 53 for determining Ks_NAF from the KDF and a modified parameter derived from Q and a corresponding original parameter of the KDF(S7.5, S8.5).

The UE 500 also comprises a memory module 56 and a receiver 57 which along with the sender 51 is used to communicate securely with the NAF over reference point Ua once Ks_NAF has been established (S7.7). The UE 500 also comprises a processor 50, sender 58, and receiver 59, which together perform the AKA protocol with the BSF over reference point Ub to establish Ks as hereinbefore defined. The UE 500 optionally comprises one or both of an input device 54 for receiving a secret from the user (S7.1.1) and a receiver 55 for receiving a secret or information derived from a secret from another device (S7.1.3), and a processor 513 for calculating the secret shared with the NAF from the secrets received by the input device 54 and/or the receiver 55 (S7.1). The UE 500 may also comprise a processor 512 for performing a secondary procedure to further secure the connection with the NAF based on the shared secret (S7.8). The UE 500 comprises a Subscriber Identity Module (SIM), which may be contained on a Universal Integrated Circuit Card (UICC, 514), and/or a mobile equipment (ME). The UICC 514 may comprise one or more of the memory module 56 and/or processors 50, 52, 53, and/or 512. If a dedicated UICC is present, the ME comprises those components of the UE 500 listed above and not in the UICC 514, and interfaces for providing access to the components on the UICC 514.

It is noted that with GBA_ME case, all the processing required for the proposed solution will be done in the ME, even if a dedicated UICC is present. In the GBA_ME case, the key Ks (and by necessity then also KS_NAF and all processing) will always be stored/processed outside the UICC. The memory 56 (storing Ks) will be in the ME in the GBA_ME case, and not in the UICC as shown in FIG. 5. The units 52, 53 and 512 will be located within the ME (i.e. outside UICC). In the GBA_U case, they may be either in the UICC or the ME.

Figure 6:
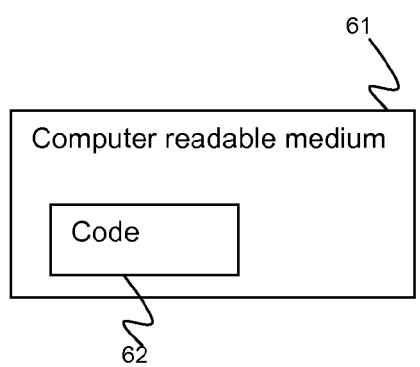
FIG. 6 illustrates schematically a computer program product for use in the modified GBA.

FIG. 6 illustrates schematically a computer program product, comprising a computer readable medium 61 on which is stored computer readable code 62, which, when run on a NAF or UE, causes the NAF or UE to behave as a NAF or UE according to the present invention.

Figure 7:
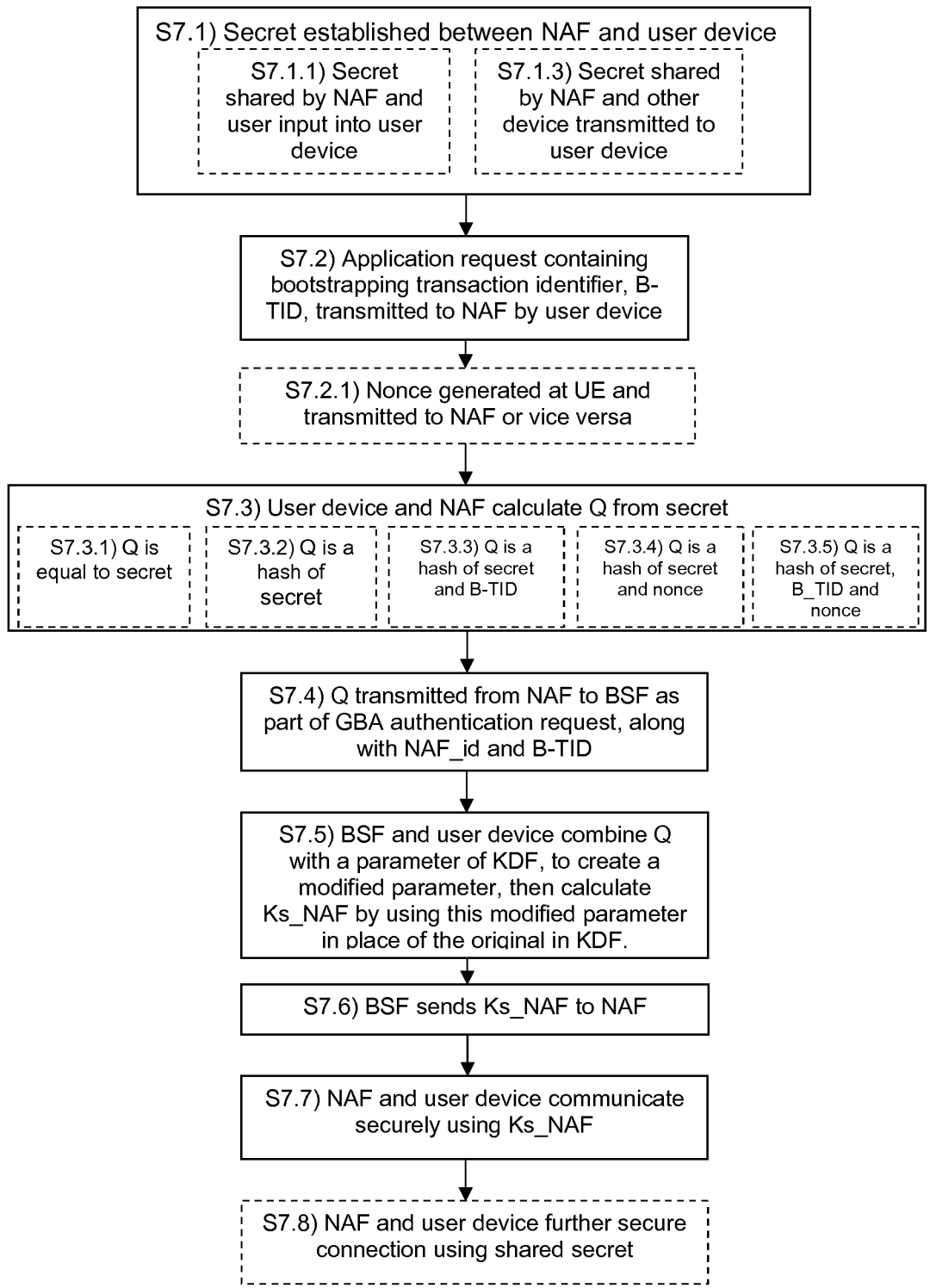
FIG. 7 is a flowchart illustrating the procedure for the modified GBA.

FIG. 7 is a flowchart of the modified GBA, as in the first embodiment, with optional elements indicated by dashed boxes. To begin, a secret is established between the NAF and the UE (S7.1). This may be by user input S7.1.1, a previously established value stored in the UE, or by transmission from some other device S7.1.3. The UE sends an application request to the NAF containing the B-TID S7.2. If a nonce is to be used in generating the NAF_id, it will be generated at the UE and transmitted to the NAF or vice versa S7.2.1.

The UE and NAF then generate a quantity Q from the secret S7.3. This may be the secret S7.3.1, a cryptographic hash of the secret S7.3.2, a hash of the secret and the B-TID S7.3.3, a hash of the secret and a nonce S7.3.4, a hash of the secret, B-TID, and nonce S7.3.5, or some other quantity.

The NAF transmits the B-TID, NAF_id and Q to the BSF as part of the GBA authentication request S7.4. The BSF and UE then compute Ks_NAF by using a modified parameter derived from Q and a corresponding original parameter of the KDF in place or in addition to the original parameter in the KDF S7.5. This key Ks_NAF is then transmitted by the BSF to the NAF S7.6 and used to secure communication between the NAF and the UE S7.7. Optionally, the connection may be further secured based on the secret established between the NAF and the UE, to prevent the network being able to access communications S7.8.

Figure 8:
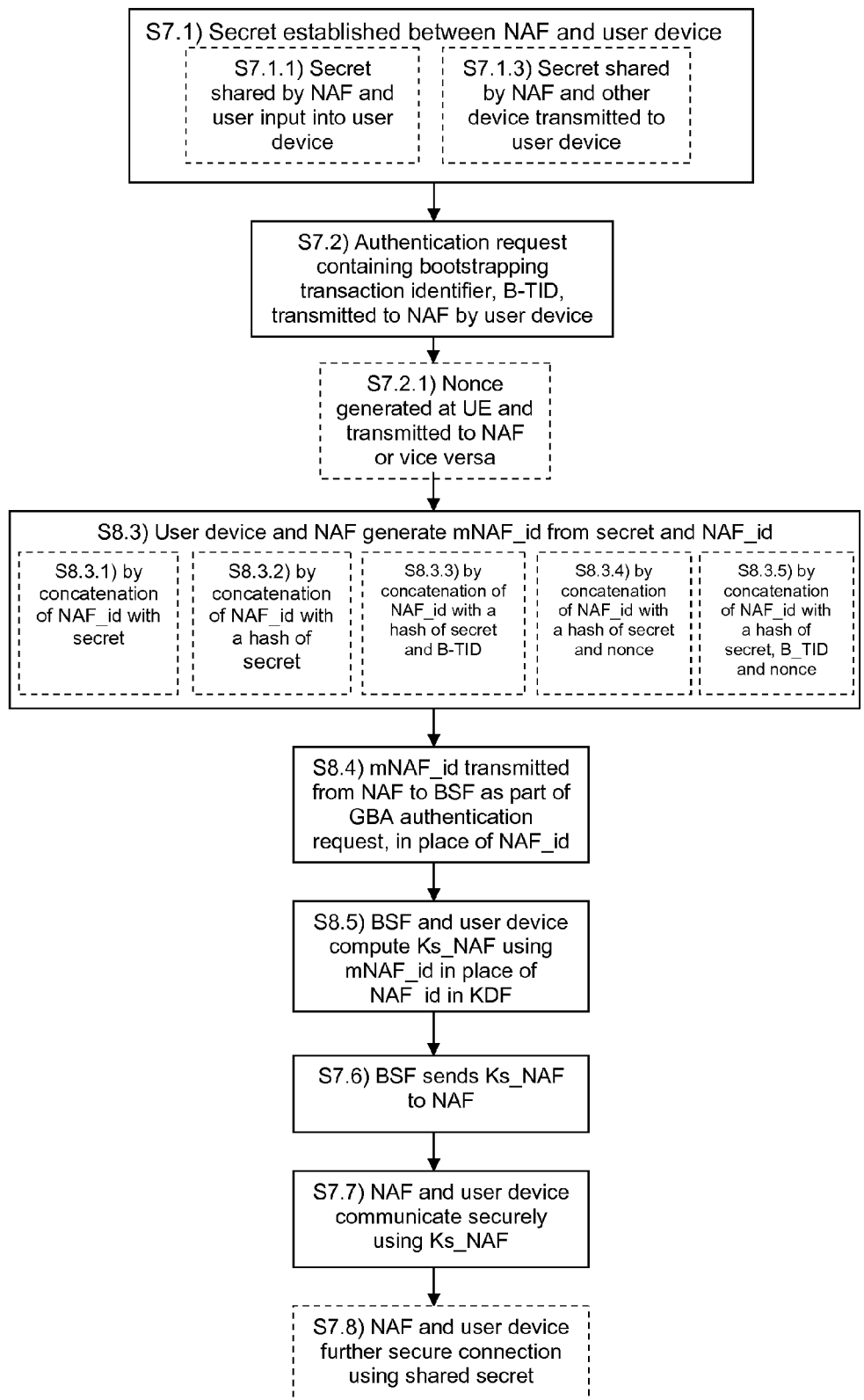
FIG. 8 is a flowchart illustrating the procedure for the modified GBA in the case where NAF_id is modified.

FIG. 8 is a flowchart of the modified GBA, as in the second embodiment, with optional elements indicated by dashed boxes. Stages S7.1 through S7.2.1 are identical to those in FIG. 7. Following the sending of the application request to the NAF S7.2 and optionally the transmission of the nonce S7.2.1, the UE and the NAF generate a modified NAF_id, mNAF_id, from the NAF_id and the secret S8.3. This may be by concatenation of the NAF_id with the secret S8.3.1, with a cryptographic hash of the secret S8.3.2, with a hash of the secret and the B-TID S8.3.3, with a hash of the secret and a nonce S8.3.3, or with a hash of the secret, B-TID, and nonce S8.3.4, or by some other method. The mNAF_id is transmitted from the NAF to the BSF as part of the GBA authentication request, in place of NAF_id S8.4. The BSF and UE then compute Ks_NAF using mNAF_id in place of or in addition to NAF_id in the KDF S8.5. Following this, stages S7.6 through S7.8 proceed as in FIG. 7.

While the above embodiments and background refer to a user equipment, UE, this term is used as it is the term in the prior art for a device serving a particular function in the GBA and containing a Subscriber Identity Module (SIM/USIM) either as a physical SIM (removable or embedded) or downloadable SIM, and should not be taken to imply that the above embodiments require the device to be one designed for human operation unless otherwise stated. Examples include medical sensors that monitor a patient and autonomously send the acquired information to a hospital server, smart token devices used as One-Time Password (OTP) for synchronized authentication with a server, diagnostics/entertainment devices in cars communicating with car manufacturer/media sever, any kind of sensor or actuator device in a "smart-grid" communicating with a utility company server, etc.

It will be appreciated by the person of skill in the art that various modifications may be made to the above described embodiments without departing from the scope of the present invention as defined by the appended claims. For example, it will be readily appreciated that although the above embodiments are described with reference to parts of a 3GPP network, an embodiment of the present invention will also be applicable to like networks, having like functional components. The invention is also applicable to architectures substantially similar to GBA, in which the UE and BSF (or equivalents) establish a shared key, and the security mechanisms used between the UE and NAF employ a second key derived from that key.

The invention claimed is:

1. A method of operating a user equipment (UE) using the Generic Bootstrapping Architecture (GBA) the method comprising:
    establishing a shared secret between the UE and a Network Application Function (NAF);
    sending, by the UE, an authentication request to a Bootstrapping Server Function (BSF);
    receiving an original parameter intended for a key derivation function and a bootstrapping transaction identifier from said BSF;
    sending, by the UE, an application request to the NAF including said bootstrapping transaction identifier;
    deriving, by the UE, a modified parameter from said secret and the original parameter intended for the key derivation function;
    determining, by the UE, a cryptographic key using said modified parameter in place of or in addition to the original parameter in the key derivation function; and
    securing communications with the NAF using said key.

2. A method according to claim 1, wherein said original parameter is a NAF_id, and said modified parameter is a modified NAF_id.

3. A method according to claim 1 and comprising:
    negotiating with the NAF in order to establish a further shared security parameter or parameters, the negotiation being secured based on said key.

4. A method according to claim 3 wherein said further shared security parameter or parameters is established based on said shared secret.

5. A method according to claim 1 wherein said information derived from said secret is said secret.

6. A method according to claim 1 wherein said information derived from said secret is the result of a cryptographic hash function applied to said secret and optionally said bootstrapping transaction identifier.

7. A method according to claim 1 comprising:
    generating a nonce; and
    sending said nonce to the NAF; and
    wherein said information derived from said secret is the result of a cryptographic hash function applied to said secret and said nonce and optionally said bootstrapping transaction identifier.

8. A method according to claim 1 comprising:
    receiving a nonce from the NAF; and
    wherein said information derived from said secret is the result of a cryptographic hash function applied to said secret and said nonce and optionally said bootstrapping transaction identifier.

9. A method of operating a network application function (NAF), the method comprising:

establishing, by the NAF, a shared secret between a user equipment (UE) and the NAF;
receiving, by the NAF, an application request containing a bootstrapping transaction identifier from the UE;
derive, by the NAF, a modified parameter from said secret and bootstrapping transaction identifier;
sending, by the NAF, an authentication request comprising said bootstrapping transaction identifier, a NAF identifier (NAF_id), and the modified parameter derived from said secret to a Bootstrapping Server Function, BSF;
receiving a NAF key from the BSF; and
utilizing said NAF key to secure communication with the UE.

10. A method according to claim 9, wherein said authentication request comprises a modified NAF_id, said modified NAF_id being a concatenation of said NAF_id and said the modified parameter derived from said secret.

11. A method according to claim 9, and comprising:
    negotiating with the UE in order to establish a further shared security parameter or parameters, the negotiation being secured based on said NAF key.

12. A method according to claim 11, wherein said security parameter or parameters is established based on said shared secret.

13. A method according to claim 9, wherein said modified parameter derived from said secret is said secret.

14. A method according to claim 9, wherein said modified parameter derived from said secret is the result of a cryptographic hash function applied to said secret and optionally said bootstrapping transaction identifier.

15. A method according to claim 9 comprising:
    receiving a nonce from the UE; and
    wherein said modified parameter derived from said secret is the result of a cryptographic hash function applied to said secret and said nonce and optionally said bootstrapping transaction identifier.

16. A method according to claim 9 comprising:
    generating a nonce; and
    sending said nonce to the UE; and
    wherein modified parameter derived from said secret is the result of a cryptographic hash function applied to said secret and said nonce and optionally said bootstrapping transaction identifier.

17. A method of operating a bootstrapping server function (BSF), the method comprising:
    receiving from a network application function (NAF), an authentication request comprising a bootstrapping transaction identifier, a NAF identifier (NAF_id), and information associated with a secret between the NAF and a UE;
    determining a NAF-key (Ks_NAF) by using a modified parameter, derived from both said information associated with said secret between the NAF and the UE and an original parameter of a key derivation function, in place of or in addition to the original parameter in the key derivation function; and
    transmitting said NAF key from the BSF to said NAF.

18. A method according to claim 17, wherein said original parameter is said NAF_id, said modified parameter is a modified NAF_id, and said authentication request comprises said modified NAF_id, said modified NAF_id comprising said NAF_id and information about said secret.

19. A method according to claim 17, and comprising, prior to determining said NAF key:

determining said modified parameter from both said information about said secret and said original parameter of said key derivation function.

20. An apparatus configured to operate as a user equipment (UE) for use in a network, the apparatus comprising:
a memory; and
at least one processor having access to said memory, the at least one processor operable to:
establish a shared secret between the UE and a Network Application Function (NAF);
send an authentication request to a Bootstrapping Server Function (BSF);
receive an original parameter intended for a key derivation function and a bootstrapping transaction identifier from the BSF;
send an application request to the NAF, the application request comprising the bootstrapping transaction identifier;
derive a modified parameter from said secret and the original parameter intended for the key derivation function;
determine a cryptographic key using at least the modified parameter in place of or in addition to the original parameter in the key derivation function; and
secure communications with the NAF using the cryptographic key.

21. The apparatus according to claim 20, wherein the at least one processor is further operable to negotiate with the NAF in order to establish at least one further shared security parameter, wherein a negotiation between the NAF and the UE is secured based on the cryptographic key.

22. The apparatus according to claim 21, wherein the at least one further shared security parameter is established based on the shared secret.

23. The apparatus according to claim 20, further comprising an interface configured to connect to a universal integrated circuit card (UICC).

24. The apparatus according claim 20, wherein:
the original parameter is a NAF identifier (NAF_id) assigned to the NAF; and
the modified parameter is a modified NAF_id.

25. The apparatus according to claim 20, wherein the at least one processor is further operable to determine the modified parameter by concatenation of the original parameter with the secret.

26. The apparatus according to claim 20, wherein the at least one processor is further operable to:
perform a cryptographic hash function on the secret; and
determine the modified parameter by concatenation of the original parameter with the result of the cryptographic hash function.

27. The apparatus according to claim 20, further comprising an input device operable to receive input information related to the secret from a user, and wherein the at least one processor is further operable to determine the secret from the input information and store the secret or a result derived from the secret in the memory.

28. The apparatus according to claim 20, wherein the processor is further operable to
receive information related to the secret from some other apparatus;
determine the secret from the information; and
store the secret or a result derived from the secret in the memory.

* * * * *